Dec. 13, 1932.  D. C. LEAMING  1,890,855
SPEED INDICATOR SWITCH
Filed Feb. 5, 1930
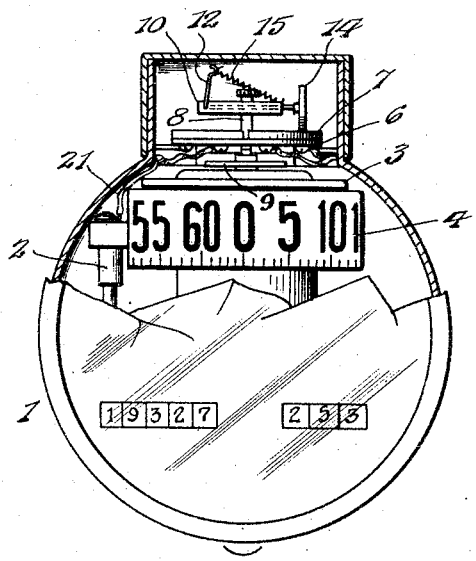
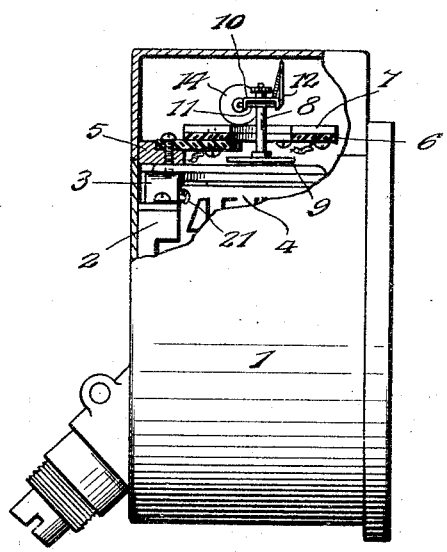
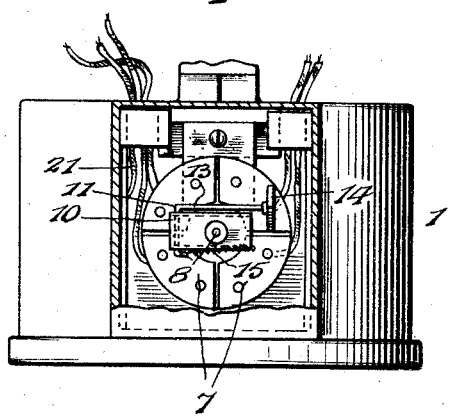
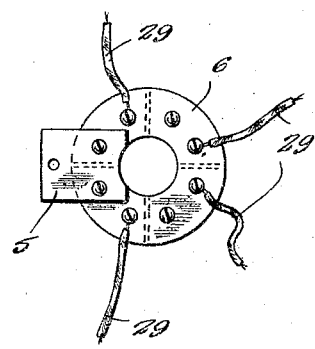
Inventor
D. C. Leaming.
By Lacey & Lacey,
Attorneys Patented Dec. 13, 1932

1,890,855

UNITED STATES PATENT OFFICE

DAVID C. LEAMING, OF SPOKANE, WASHINGTON

SPEED INDICATOR SWITCH

Application filed February 5, 1930. Serial No. 426,148.

The object of this invention is to provide a switch whereby signals will be displayed as a vehicle, traveling on land, water or air, attains predetermined speeds and the operator, as well as the occupants of other vehicles and pedestrians, may be informed of the approximate speed at which the vehicle is moving. The invention seeks to provide such a mechanism which will be operated by the usual speedometer and will serve to notify the operator when his speed is exceeding the limit prescribed by regulation. The invention is illustrated in the accompanying drawing and will be hereinafter first fully described and then more particularly defined in the appended claims.

In the drawing:

Figure 1 is a sectional view of a speedometer showing the signal controlling mechanism mounted thereon, Figure 2 is a top plan view of the speedometer with parts in horizontal section, Figure 3 is a side elevation, partly broken away, and viewed at a right angle to Figure 2, and Figure 4 is a detail bottom plan view of the stationary circuit closing element.

The speedometer, indicated at 1, may be of any known or approved form and in itself forms no part of the present invention, a detailed description of the same being, therefore, deemed unnecessary. In carrying out the present invention, there is provided a frame 2 which is secured within the speedometer casing in any convenient manner and may be a part of the usual equipment. The frame includes an upper member or plate 3 which projects forwardly above the indicator dial 4 of the speedometer shaft and provides a bearing for the speedometer shaft. Secured upon this plate 3 is a block 5 and an annulus 6 of insulation which is disposed above and concentric with the forwardly projecting plate or portion of the frame 3 and has its central opening in axial alinement with the speedometer shaft. Upon the upper side of the annulus 6 are secured segmental plates 7 of metal which are out of contact at their ends and, therefore, fail to make electrical connection. Of course, any desired number of these segments may be employed, according to the different speeds deemed advisable to be denoted, four segments being illustrated in the drawing. Fitted to the upper end of the speedometer shaft in any convenient manner is an indicator shaft 8 which rises through the central opening of the annulus 6 and is rotated by and with the speedometer shaft, as will be understood. Around the lower end of the indicator shaft 8 is disposed a volute spring 9 which has one end secured to the shaft and its opposite end secured to the frame member 3 so that when the shaft is turned by the action of the speedometer, the spring will be put under increased tension and when the speedometer is at rest, the spring will at once return the indicator shaft to its initial normal position. Carried by the upper end portion of the indicator shaft is a plate 10, in one end of which is journaled a rock shaft 11 having one end formed into or equipped with a crank 12 which normally extends upwardly, as shown most clearly in Figures 2 and 4, and at the opposite end of which is an arm 13 which extends parallel with the side of the plate 10 to project past the indicator shaft and carries a roller 14 which rests upon one of the segments 7 and makes electrical contact therewith. The roller is yieldably held to the segments 7 by a spring 15 having one end attached to the free end of the crank 12 and its opposite end fixed to the plate 10. It will be noted that, as the indicator shaft 8 rotates, the plate 10 will also rotate with it and carry the arm 13 and roller 14 over the respective segments 7 and as the roller passes from one segment to another a circuit will be formed which will energize signals connected with the respective segments so that the approximate speed of the vehicle will be indicated.

The signals may be of any approved style or form but will preferably be incandescent lamps each electrically connected with one of the segments so as to be energized as the traveling contact 14 engages the respective segments. From one side of the car battery a conductor 21 leads to the frame 2, to which it is secured so as to make electrical contact therewith, as shown in Figures 1, 2 and 3, the current passing from the conductor through the frame to the shaft 8 and thence, of course, through the plate 10 and the rock shaft 11 to the roller 14. The opposite side of the battery is connected to sets of signals displayed in any desired position, usually one set located upon the instrument board of the vehicle, one set located in any approved position at the front of the vehicle, and another set located at the rear of the vehicle. The latter side of the circuit is connected to one side of each lamp in the several sets of lamps and from the opposite side of each lamp there extend conductors leading to return wires 29 corresponding in number to the segments 7 and each extending to and electrically connected with one of the segments, as specifically shown in Figure 4. It will be understood that when the roller 14 rests upon any one of the segments 7 a circuit is closed from the roller through the segment and the conductor attached to the respective segment, to the corresponding lamp in each set of lamps, so that each set of signals will indicate the same speed of the vehicle. As the speed of the vehicle increases or decreases, the shaft 8 will turn accordingly and the roller 14 will be shifted from one segment to another segment, the circuit being broken as the roller passes over the gap between adjacent segments and another circuit being established when the roller clears the gap. It is obvious that each segment of the stationary circuit closer will represent a definite range of speeds and the operator will know according to the color of the lamp which may be energized that he is traveling at a rate within well defined limits. This knowledge will also be available to pedestrians and approaching or following motorists so that the liability of collisions and other accidents will be lessened. Of course, the operator of the vehicle should be informed of the speed of his vehicle by observing the speedometer but his attention is frequently so centered upon the operation of the machine that he does not observe the speedometer as closely as he might. By locating a set of signals upon the instrument board and providing means for activating those signals automatically, the attention of the operator is necessarily attracted so that he is informed, without special care on his own part, of the velocity of the vehicle. It will be readily noted that my invention provides an exceedingly simple mechanism which may be mounted upon any speedometer and operated thereby and which may display signals at any desired location or series of locations upon the vehicle. It will be understood that, while lamps are preferred as the form of signals to be used, other types of signals may be employed and audible signals may be provided as well as visual signals.

What is claimed is:

1. In a speed indicator system for vehicles, the combination of a rotatable indicator shaft, a plurality of stationary contacts arranged end to end in an annular series concentric with the shaft, conductors connected to the respective contacts, a supporting frame insulated from said contacts and supporting the shaft, a conductor connected to the frame, a plate carried by the shaft, a contact member mounted on said plate and including a roller arranged to rest on and travel over the respective stationary contacts, and means for yieldably holding the roller to the contacts.

2. In a speed indicator system for vehicles, the combination of a rotatable indicator shaft, a plurality of stationary contacts insulated from the shaft and disposed end to end in an annular series concentric therewith, an electrical conductor connected with the shaft, a plate secured on the shaft, a rock shaft mounted in said plate and having an arm extending past the end of the plate, a roller mounted on said arm to rest upon and travel over said stationary contacts and make electrical connection therewith, an upstanding arm at the opposite end of the rock shaft, and a spring connecting said arm with the plate on the shaft and yieldably holding the roller to the stationary contacts.

In testimony whereof I affix my signature.

DAVID C. LEAMING. [L. S.]